July 2, 1929.  E. J. POSPESHIL  1,719,308
DASHPOT FOR CALCULATING MACHINES
Filed April 16, 1927
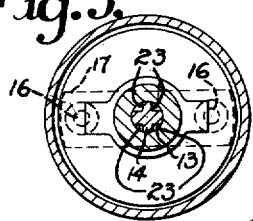
Fig. 3.
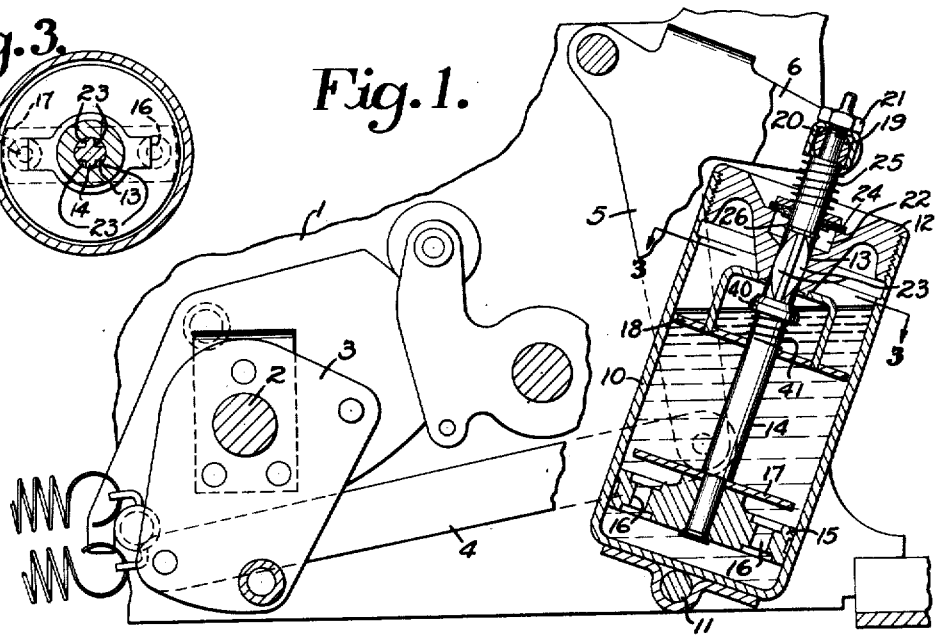
Fig. 1.
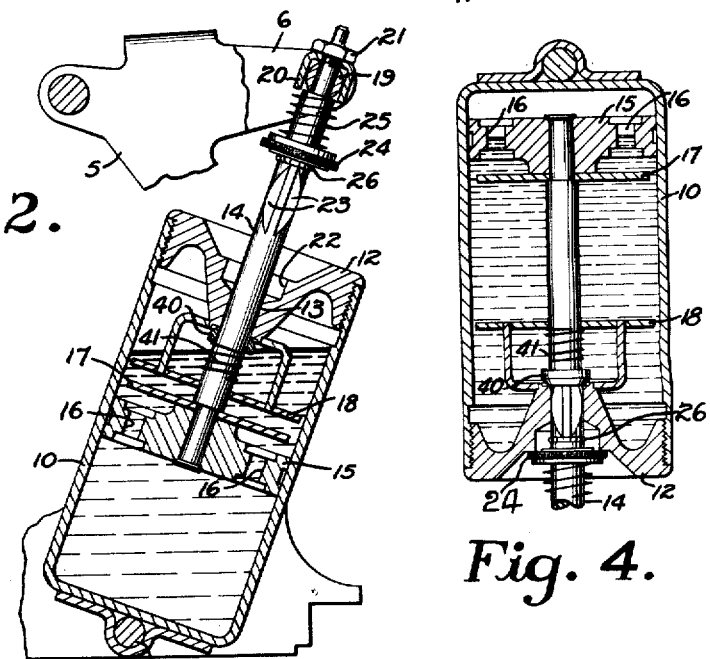
Fig. 2.
Fig. 4.
INVENTOR
Emile James Pospeshil
BY
Rector, Hibben, Davis, & Macauley
ATTORNEYS Patented July 2, 1929.

1,719,308

UNITED STATES PATENT OFFICE.

EMILE JAMES POSPESHIL, OF DETROIT, MICHIGAN, ASSIGNOR TO BURROUGHS ADDING MACHINE COMPANY, OF DETROIT, MICHIGAN, A CORPORATION OF MICHIGAN.

DASHPOT FOR CALCULATING MACHINES.

Application filed April 16, 1927. Serial No. 184,421.

This invention relates to a dash pot for use with calculating and accounting machines.

It is common practice to dampen the strokes of a calculating machine by means of a dash pot having a piston working in a body of oil. These dash pots have piston rods which move out and in at each operation of the machine, and it frequently happens that the piston rods carry a small amount of oil with them to the outside of the dash pot. Provision is made for draining this oil back into the dash pot but this usually leaves openings between the interior and the exterior of the dash pot so that if the machine is turned upside down or on its side, there is a tendency for the oil to run out. A valve is sometimes placed on the outside of the dash pot but it moves away from closed position when the handle of the machine is pulled forward with the result that, if the machine is tilted when the handle is forward, oil will run out. This is not serious in large, heavy calculating machines because they usually remain in normal position but it frequently happens that small portable machines are held upside down or in some abnormal position while being moved about and it may easily happen that the handle is out of normal position when this occurs. If the oil runs out of the dash pot under these conditions, it not only decreases the supply below that necessary for the proper working of the dash pot but the oil may also damage the clothing of the operator, the floor covering, or other articles associated with the machine. The present invention is directed to a solution of this problem.

The general object of the invention is to provide an improved dash pot for accounting machines that will prevent oil running out of the dash pot when the machine occupies an abnormal position.

Another object is to provide an improved dash pot for calculating machines which will prevent leakage of oil when the machine is tilted or moved to an abnormal position when the operating handle is out or normal position.

Other objects and advantages of the invention will hereinafter appear.

An embodiment of the invention is shown in the accompanying drawings in which:

Fig. 1 is a sectional side view of the dash pot showing the parts in normal position and including portions of the operating parts of a calculating machine.

Fig. 2 is a sectional view similar to Fig. 1 but with the parts elevated to the highest position that they occupy during the operation of the machine.

Fig. 3 is a horizontal section on the line 3—3 of Fig. 1.

Fig. 4 is a longitudinal section through the dash pot showing the parts in the position they occupy when the dash pot is inverted with the piston in normal position.

The dash pot is shown associated with a calculating machine of a type known as the Burroughs portable. This machine includes a side frame 1 supporting an operating shaft 2 to which is connected a driving plate 3 that in turn is connected by a link 4 to one arm 5 of a pivoted bell crank lever whose other arm 6 is connected to the piston rod of the dash pot. During a forward stroke of the machine, the operating shaft 2 is rocked counter-clockwise and, upon the return stroke, it moves clockwise to its original position, during which operation the piston rod is first raised from the position of Fig. 1 to that of Fig. 2 and returned.

The dash pot includes a fluid receptacle 10 pivoted at 11 to permit the receptacle to accommodate itself to the arcuate movement of the arm 6 of the bell crank lever. The upper end of the receptacle is closed by a threaded cover or end plate 12 which has a circular opening 13 (Fig. 3) through which the piston rod 14 operates.

A piston 15 operating on the inside of the dash pot is fixed to the lower end of the piston rod 14 and this piston is provided with a number of openings 16 to permit passage of oil from its top to its bottom side and vice versa but these openings are restricted so as to prevent a too rapid flow of the oil. A baffle plate 17 is mounted immediately above the piston to prevent agitation of the oil and promote a smoother action. A second baffle plate 18 may be used but since the same forms no part of the present invention its purpose and function will not be described. The upper end of the piston rod 14 has a reduced portion which extends through a stud 19 journaled in the yoke-shaped arm 6, and through a spacing-yoke 20 which is astride the stud. A lock nut 21 holds the parts together.

In the normal operation of a dash pot of this character, a certain amount of oil is carried outside of the dash pot by the piston 14. In order to provide a place for collecting this oil an oil well 22 is formed in the upper surface of the end plate 12 adjacent the piston rod. This oil well is of such size as to readily accommodate any oil that gets outside the casing and while it is desirable to have a place where such oil may be collected, it is not desirable to have the oil remain on the outside as it would run off the dash pot whenever the machine was turned on its side, upside down, etc. Accordingly, provision is made for draining this oil back into the interior of the receptacle, and, in the present case, this consists in providing a number of grooves 23 in the surface of the piston rod. These grooves are positioned so that they form passage-ways between the oil well 22 and the interior of the receptacle when the piston is in its normal position shown in Fig. 1. Whenever the machine is in normal position and the piston is down as shown in Fig. 1, any oil in the oil well drains into the interior of the receptacle. It will be observed, however, that this provision for drainage leaves openings from the interior to the outside of the dash pot and if means were not provided for preventing it, the oil would run out of the dash pot whenever the machine was turned on its side or upside down. There are two conditions under which this might occur, namely, (1) when the piston is in its normal position as illustrated in Fig. 1 and (2) when it is out of its normal position, i. e., in any of the positions between that of Fig. 1 up to and including that of Fig. 2.

In order to prevent oil flowing out of the well 22 when the piston is in its normal position, a spring pressed valve 24 is provided comprising a leather washer held between two metal washers, the valve being urged to closed position by a spring 25 surrounding the upper end of the piston rod and bearing against the member 20. This valve keeps the oil well tightly closed when the piston is in normal position and prevents any oil flowing out if the machine happens to be turned to an abnormal position. The length of the stroke of movement of the piston is such, however, that it is not desirable to have this valve moved over the piston in order to keep it closed as would be required and as will be clear by reference to Fig. 2. Accordingly, a circular spring washer 26 is provided that limits the downward movement of the valve and results in the valve being carried away from the oil well when the piston is raised as illustrated in Fig. 2. While this valve closes the oil well when the piston is in normal position, it does not act in this capacity as soon as the piston has moved slightly away from normal position and it is therefore necessary to provide additional means for insuring that oil will not flow out of the dash pot when the operating handle is pulled away from normal.

When the piston moves away from normal the grooves 23 move upwardly and the main body of the piston closes the passage-ways that existed from the interior to the exterior of the dash pot so that there is no free opportunity for the oil to flow out but the fit of the piston may be such that some oil will tend to flow out, particularly if the machine is left in an abnormal position for some time.

In order to prevent the flow of oil to the outside of the dash pot when the piston is out of normal position a second valve 40 is provided, comprising a ring slidably mounted on the piston rod 14. The upper face of this ring is slightly flat and bears against the bottom side of the end piece 12. The valve normally occupies the position illustrated in Fig. 1 where it rests against a spring 41 fitting tightly around the piston rod 14. When the piston rod is raised the spring is carried with it and this carries the valve up against its seat where it is held by spring pressure. Continued upward movement of the piston causes the spring to slide on the piston rod, thereby assisting in cleaning the oil from it. When the piston rod is returned to lowered position the spring moves with it until it strikes the baffle plate 18 which limits its downward movement after which the piston slides through the spring. The valve 40 thus moves automatically to closed position whenever the piston is moved from normal position and, in this closed position, it prevents oil from flowing out whenever the machine is turned on its side, upside down, or in some other abnormal position.

The valve 40 also operates in conjunction with the valve 24 to prevent the exit of oil when the piston is in normal position. In such event the valve 40 may not be moved to its seat by the spring 41 entirely but instead is moved by gravity together with such initial movement as the spring 41 may give it to the position of Fig. 4 where it closes the inner ends of the passages formed by the grooves 23 and thus prevents oil reaching the oil well 22 while at the same time the valve 24 closes the outside of the oil well. A double blocking of the flow of oil is thus provided at the time when it is most needed, that is, when the grooves 23 are in position to form free passage-ways from the interior to the exterior of the dash pot.

It is to be understood that the construction shown is for purposes of illustration only and that variations may be made in it without departing from the spirit and scope of the invention as defined by the appended claims.

I claim:

1. A dash pot for calculating machines comprising a fluid receptacle, a piston having a piston rod movable through an opening in the upper end of said receptacle, and an oil well on the outside of said upper end, said piston having grooves positioned so that when the piston is in normal position the grooves form passages between the oil well and the interior of the receptacle and when the piston is moved from normal position said grooved portions move out of position for forming such passageways.

2. A dash pot for calculating machines comprising a fluid receptacle, a piston having a piston rod movable through an opening in the upper end of the receptacle, an oil well adjacent the piston rod and in the outside of the upper end of the receptacle, said piston rod having grooves forming passages between the oil well and the interior of the receptacle when the piston is in normal position but movable away from position to form said passages when the piston is moved from normal, and a spring pressed closure for closing said oil well when the piston is in normal position.

3. A dash pot for calculating machines having a fluid receptacle, a piston having a piston rod movable through an opening in the upper end of said receptacle, said piston rod having grooves forming passages between the interior of said receptacle and the outside thereof when the piston is in normal position, and a valve for automatically closing said passages when the dash pot is moved to such a position that the fluid would tend to run out of said passages.

4. A dash pot for calculating machines comprising a fluid receptacle, a piston having a piston rod movable through an opening in the upper end of said receptacle, said piston rod having grooves forming passages between the interior and the exterior of the receptacle when the piston is in normal position, a valve normally closing said passages when the piston is in normal position but movable to open them when the piston is moved from normal position, and a second valve acting to automatically close said passages when the dash pot is moved to an abnormal position such that the fluid would tend to run out of the passageways.

5. A dash pot for calculating machines having a fluid receptacle, a piston having a piston rod movable through an opening in the upper end of said receptacle, an oil well adjacent the piston rod and on the outside of the upper end of said receptacle, said piston rod having grooves normally forming passages between the oil well and the interior of the receptacle when the piston is in normal position, a spring pressed valve for closing the oil well when the piston is in normal position but movable to open said well when the piston is moved away from normal, and a second valve operating to automatically close said passages when the dash pot is moved to an abnormal position such that the fluid would tend to run out of the receptacle.

6. A dash pot for calculating machines comprising a fluid receptacle, a piston having a piston rod movable through an opening in the upper end of the receptacle, passages from the interior to the exterior of the upper end of the receptacle, a valve closing said passages when the piston is in normal position but movable to open them when the piston is moved away from normal, and a second valve automatically moved to closed position by the piston when it is moved from normal position.

7. A dash pot for calculating machines comprising a fluid receptacle, a piston having a piston rod movable through an opening in the upper end of the receptacle, an oil well in the outside surface of said upper end, said piston rod having grooves forming passages between the oil well and the interior of the receptacle when the piston is in normal position, a valve for closing said oil well when the piston is in normal position, and a second valve automatically moved to closed position by the piston when it is moved away from normal.

8. The combination in a calculating machine of an operating handle adapted to occupy a normal position, a dash pot having a closed fluid receptacle, a piston operating in said receptacle, a piston rod for the piston extending to the exterior of the receptacle and connected to the operating handle, openings from the interior to the exterior of the receptacle at the top thereof, and means operated positively by movement of the handle away from its normal position for automatically closing said openings.

9. The combination in a calculating machine of an operating handle, a dash pot having a closed fluid receptacle, a piston operating in said receptacle, a piston rod for said piston extending to the exterior of the receptacle and connected to the handle, openings from the interior to the exterior of the receptacle at the top thereof, said openings being normally open from the interior of the receptacle when the dash pot is not in use and means for automatically closing said openings when the dash pot is tilted or otherwise moved to such a position that fluid tends to run out of said openings.

10. The combination in a calculating machine of an operating handle adapted to occupy a normal position, a dash pot having a closed fluid receptacle, a piston operating in said receptacle, a piston rod for the piston extending to the exterior of the receptacle and connected to the operating handle, openings from the interior to the exterior at the top of the receptacle, means for automatically closing said openings when the dash pot is moved to such a position that fluid would tend to run out of said openings, and means operated positively by movement of the operating handle away from its normal position for automatically operating said closing means to close said openings.

11. A dash pot for calculating machines, comprising a closed fluid receptacle, a piston in said receptacle having a piston rod movable through an opening in the top of the receptacle, openings from the interior to the exterior of the receptacle at the top thereof, means for closing said openings on the exterior of the receptacle when the piston is in normal position, said piston being constructed to close said openings as it moves away from normal, additional means operating automatically to close said openings when the dash pot is moved to a position such that the fluid would tend to run out of said openings, and means operated by said piston for positively operating said additional means when the piston is moved away from normal.

In testimony whereof, I have subscribed my name.

EMILE JAMES POSPESHIL.

CERTIFICATE OF CORRECTION.

Patent No. 1,719,308.  Granted July 2, 1929, to

EMILE JAMES POSPESHIL.

It is hereby certified that error appears in the printed specification of the above numbered patent requiring correction as follows: Page 3, line 47, claim 4, for the word "passageways" read "passages"; and that the said Letters Patent should be read with this correction therein that the same may conform to the record of the case in the Patent Office.

Signed and sealed this 30th day of July, A. D. 1929.

(Seal)

M. J. Moore,
Acting Commissioner of Patents.

11. A dash pot for calculating machines, comprising a closed fluid receptacle, a piston in said receptacle having a piston rod movable through an opening in the top of the receptacle, openings from the interior to the exterior of the receptacle at the top thereof, means for closing said openings on the exterior of the receptacle when the piston is in normal position, said piston being constructed to close said openings as it moves away from normal, additional means operating automatically to close said openings when the dash pot is moved to a position such that the fluid would tend to run out of said openings, and means operated by said piston for positively operating said additional means when the piston is moved away from normal.

In testimony whereof, I have subscribed my name.

EMILE JAMES POSPESHIL.

CERTIFICATE OF CORRECTION.

Patent No. 1,719,308.                                   Granted July 2, 1929, to

EMILE JAMES POSPESHIL.

It is hereby certified that error appears in the printed specification of the above numbered patent requiring correction as follows: Page 3, line 47, claim 4, for the word "passageways" read "passages"; and that the said Letters Patent should be read with this correction therein that the same may conform to the record of the case in the Patent Office.

Signed and sealed this 30th day of July, A. D. 1929.

(Seal)

M. J. Moore,
Acting Commissioner of Patents.